United States Patent [19]
Kottsieper

[11] 3,708,195
[45] Jan. 2, 1973

[54] IMPACT SOFTENING DEVICE FOR AUTOMOBILES

[76] Inventor: Edward Kottsieper, Dresden, Maine 04342

[22] Filed: Jan. 27, 1972

[21] Appl. No.: 221,353

[52] U.S. Cl. .......................293/72, 293/19, 293/49
[51] Int. Cl. ..............................................B60r 19/10
[58] Field of Search............293/1, 17, 18, 19, 49, 60, 293/72, 84; 114/220

[56] References Cited

UNITED STATES PATENTS

| | | | |
|---|---|---|---|
| 1,526,725 | 2/1925 | Topham | 293/72 |
| 3,074,751 | 1/1963 | Gerin | 293/19 |
| 2,935,330 | 5/1960 | Millman | 280/33.99 |

FOREIGN PATENTS OR APPLICATIONS

| | | | |
|---|---|---|---|
| 911,102 | 4/1954 | Germany | 293/1 |

Primary Examiner—Drayton E. Hoffman
Assistant Examiner—Robert Saifer
Attorney—C. Yardley Chittick et al.

[57] ABSTRACT

An impact softening device or bumper for use on automotive vehicles consisting of resilient wheels rotatably mounted with adjustable braking means in horizontal position on vertical axles which are rigidly attached to extensions of the vehicle frame at the front and/or rear corners thereof. The resilient wheels are substantially in alignment with the front and rear wheels of the vehicle. The resilient surfaces of the horizontal wheels extend longitudinally and laterally several inches beyond the most protruding part of the vehicle body to give substantial protection when an obstacle is encountered.

7 Claims, 5 Drawing Figures

PATENTED JAN 2 1973 3,708,195

IMPACT SOFTENING DEVICE FOR AUTOMOBILES

BACKGROUND OF THE INVENTION

Bumpers for automobiles have a long history. Shortly after the initial development of the automobile, bumpers in the form of crosswise extending metal members attachable to the front ends of the automobile frame were developed and sold as auxiliary equipment. In due course, bumpers became standard equipment attached to the automobile as originally sold. In the early days, the bumpers were located a substantial distance forward of the radiator and fenders so that if an obstacle was encountered, reasonable protection for the body portions of the automobile was afforded. Gradually, however, as the styling of the body became one of the most important elements in the sale of the vehicle, the bumpers receded toward the body at both the front and rear until today they are substantially merged thereby to offer little in the way of protection in the event of collision.

In recent years, the public has come to recognize the lack of effectiveness of the bumpers customarily supplied by the major manufacturers of automobiles. This point has been strongly driven home by the high cost of repairs to damaged fenders and other body parts.

Most collisions between automobiles or between a moving automobile and a stationary object occur at the corners of the front and rear fenders. At these positions, very little has been done thus far to provide even minimum protection from the most trivial collisions, such as, for example, those which occur in maneuvering an automobile in a parking lot where the speed at the time of collision is, in most cases, substantially less than five miles per hour.

Prior efforts to improve protection are illustrated, for example, in the patents to Dabroski U.S. Pat. No. 3,140,111 for Illuminated Rotatable Resilient Bumper; Topham U.S. Pat. No. 1,526,725; Doherty U.S. Pat. No. 1,774,916, and Mason U.S. Pat. No. 2,840,414. None of these prior devices, however, has gone into production.

SUMMARY OF THE INVENTION

The present invention makes use of the concept in which a wheel carrying a pneumatic tire is mounted horizontally at each of the two front corners of the automotive vehicle and, if desired, at the two rear corners as well. The wheels are rotatable about vertical axles. The surfaces of the wheels extend longitudinally and laterally beyond the body so that upon any engagement with another vehicle or stationary object at the corner or side of the vehicle, some portion of the resilient protective wheel will make engagement therewith.

The Dabroski disclosure is deficient in that the wheels are mounted on vertical axles that are secured to the fenders of the vehicles. As is well understood, automobile fenders have relatively little strength against the effects of collision and accordingly if wheels mounted thereon come into engagement with other vehicles or stationary objects, the fenders will be bent to the same extent but in different bending configuration.

The present invention is an improvement over the prior art in that the wheel axles are mounted in vertical position on extensions of the basic frame of the vehicle. Thus, when the wheels are in collision engagement with another vehicle, or a stationary object, the force of the collision is initially absorbed by the compressibility of the pneumatic tire and transmitted through an exceedingly strong structural frame arrangement to the main frame of the vehicle. This may be a rigid structure or may include an energy absorbing device in one or both of the bumper wheel supporting struts. The compressibility of the tire and the energy absorbing struts together are limited to a distance which will still be beyond the longitudinal and lateral positions of the nearest parts of the body structure, namely, the fenders. Thus, unless the collision is of such force as to be able to collapse the energy absorbing unit plus the frame structure that supports the protective wheels, the fenders and adjacent parts will be fully protected. Of course, if the obstacle engaged by the automobile is above the level of the protective wheel, then the present device will be ineffective just as all other bumper devices are ineffective in such cases.

Since the effects of the collision will be minimized somewhat if the wheel is capable of rotation, thereby to accommodate itself to the relative motion of the automobile and obstacle encountered, the wheels of the present invention are mounted in a manner that includes an adjustable braking device. The brake prevents rotation of the wheel because of windage during normal use of the vehicle, and also eliminates rattles or other objectionable noises while permitting rotation upon collision.

The resilient protective wheels that will normally be used will generally be substantially smaller than the wheels that support the vehicle on the road. Such protective wheels including the pneumatic tires are relatively inexpensive and since the axle mounting for the wheel is either on a factory built frame extension, or on an added frame consisting of inexpensive structural members that are fastened to the original automobile frame, the cost of the present invention is modest in the light of its improved protective capabilities.

DESCRIPTION OF A PREFERRED EMBODIMENT

Figure 1:
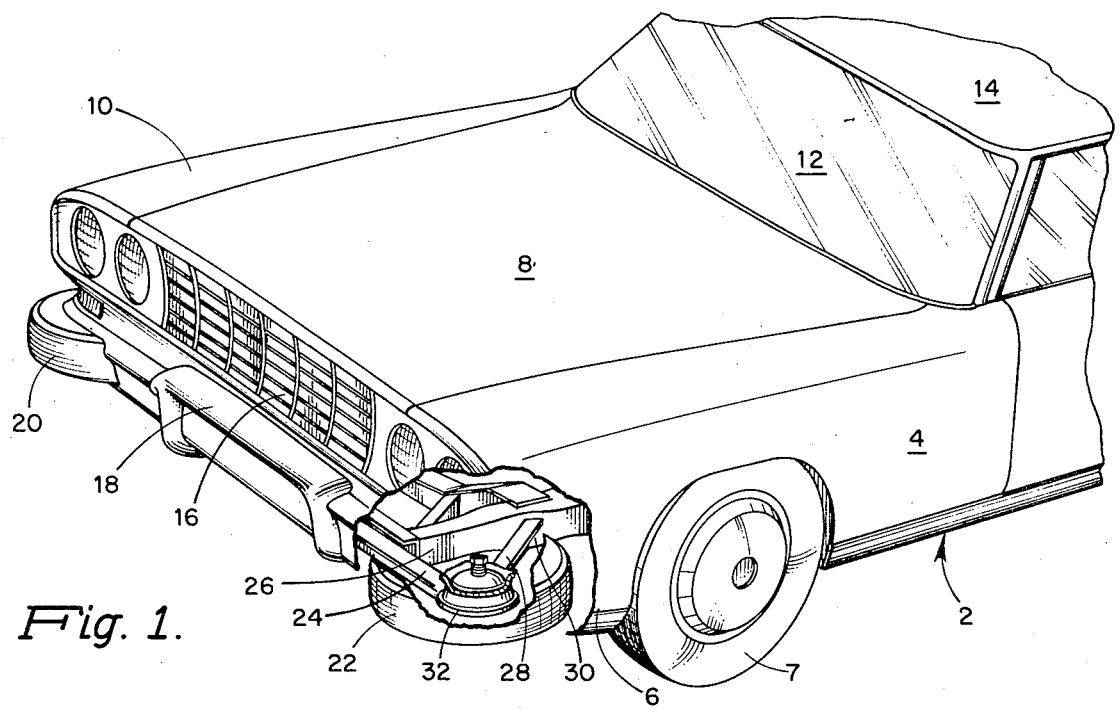
FIG. 1 is a perspective view of the front part of an automobile showing the location of the front resilient wheel bumpers. The near corner of the fender and bumper wheel is broken away to show the wheel supporting struts.

Referring first to FIG. 1, there is shown in perspective the front part of any conventional automobile generally referred to at 2. The vehicle as shown comprises a body 4 which includes a front left fender 6, front left vehicle wheel 7, a hood 8, a front right fender 10, windshield 12, top 14, radiator grill 16 and a centrally located generally conventional bumper portion 18.

FIG. 1 also shows at the front right corner of the vehicle a horizontal bumper wheel 20 and at the front left corner a horizontal bumper wheel 22. Throughout the further description of the invention, it is to be understood that the invention contemplates use of bumper wheels at all four corners of the vehicle, even though in some cases it may be considered preferable to have bumper wheels at the front corners only.

In FIG. 1, the front end of fender 6 and part of bumper wheel 22 have been broken away to illustrate one form of frame structure that supports the bumper wheel. This structure as shown also in FIG. 2 consists of a transversely extending horizontal strut 24 which may take the form of a strong angle iron, rigidly secured to the front end of the main vehicle frame 26 by bolts or welding or otherwise and a diagonal strut 28 which is secured to the frame at 30 and to the end of strut 24 at 32. The junction of struts 24 and 28 provides a location on which may be mounted means for rotatably supporting the bumper wheel. This mounting means is generally referred to as an axle, and is more specifically disclosed in FIG. 4 at 34. Axle 34 is in the form of an inverted circular dish having a raised flange 36 about its periphery and a short interior vertical circular shaft 37 concentric with flange 36. At its lower part 38, it is welded or otherwise secured to the upper surface 40 of the transversely extending angle iron that comprises strut 24. Axle 34 with its upwardly extending flange 36 and shaft 37 provides a support and locating means for a metal wheel 42 of conventional form which has mounted on its outer rim 44 a conventional automobile tire 46 of suitable size. Wheel 42 rests on a circular area 47 of axle 34 radially inward of flange 36.

Figure 3:
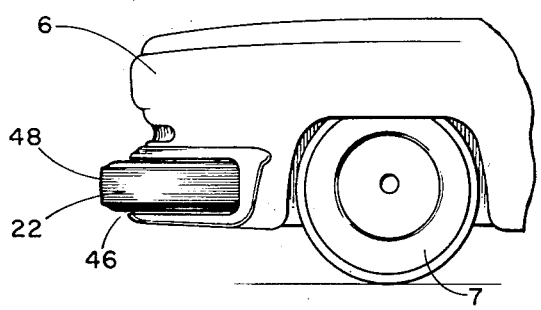
FIG. 3 is a fragmentary side elevation showing the position of the bumper wheel relative to the adjacent vehicle wheel and associated fender. This view could be considered either the front or rear of the automobile.
Figure 2:
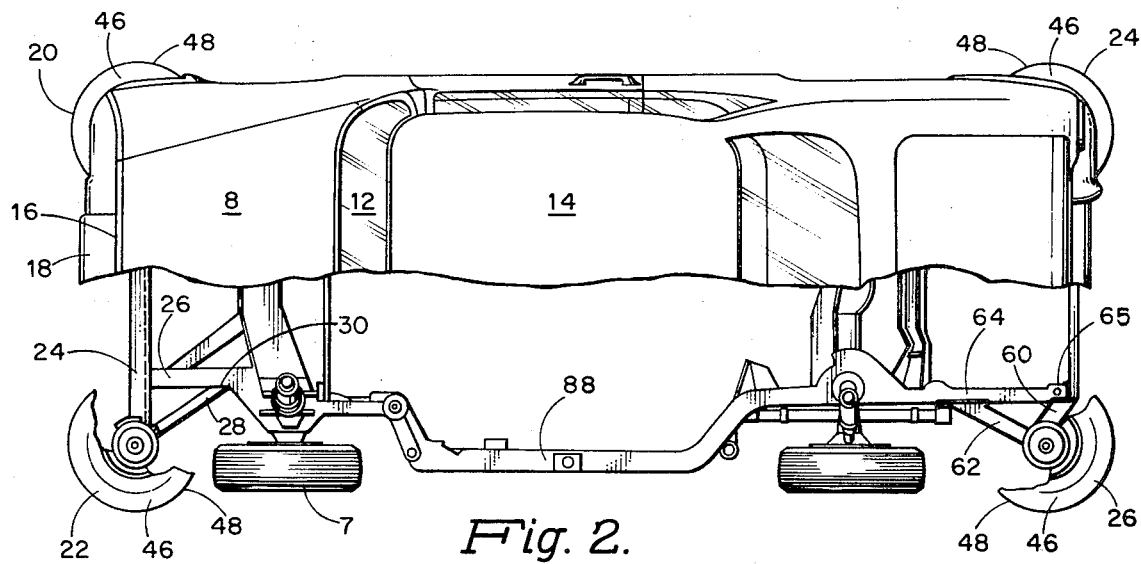
FIG. 2 is a plan view of an automobile with the body broken away at the lower part to show one form of structure at the front and rear corners that supports the bumper wheels.
Figure 4:
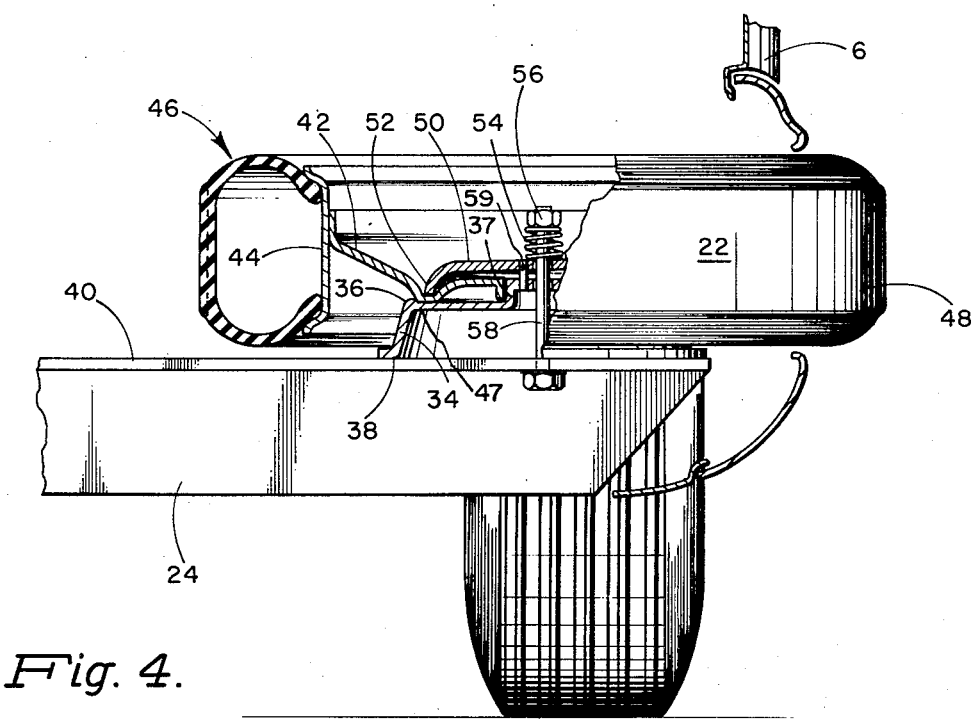
FIG. 4 is an enlarged fragmentary front elevation showing the bumper wheel broken away in part to illustrate one form of brake that may be used to restrict the rotation of the wheel upon engagement with an obstacle.

As can be seen in FIGS. 2, 3, and 4, the outer periphery 48 of tire 46 extends sidewise as at 48, beyond the maximum lateral extension of the fender 6, or any other part of the side of automobile body 4. Likewise, as illustrated in the figures, the bumper wheels 20, 22, 24 and 26 extend to the front and to the rear a substantial distance beyond any part of the automobile body so that if any obstacle is encountered by the bumper wheels, the likelihood of damage to the body will be minimized.

Again referring to FIG. 4, it will be seen that the metal wheel 42 is held in rotatable concentric position on axle 34 by a dished brake plate 50 whose circular downturned rim 52 presses against wheel 42 immediately over the circular area 47 under the influence of a spring 54 controlled by a nut 56 on the upper end of bolt 58 which extends through the upper surface 40 of transverse angle iron strut 24. Plate 50 is held against rotation by a pin 59 extending through the interior part of axle 34 and the overlying part of plate 50.

The bumper wheel itself may be described as a resilient impact absorbing wheel, and in its preferred form (as shown in FIG. 4) it is substantially the same as a conventional small automobile wheel. The tire 46 is inflated enough to render it firm against light impacts and, of course, more yielding as the impact increases.

The brake mechanism shown in FIG. 4 in which the axle 34 and plate 50 are non-rotatable with the wheel 42 rotatable therebetween serves the purpose of controlling the extent of rotation of the bumper wheel when glancing engagement is made with an obstacle at the side of the car. If the bumper wheel could not turn at all, the violence of the engagement would be increased. On the other hand, if the wheel were free to turn, it might develop automotic rotation from the velocity of the passing wind and might develop objectionable rattles or other noises.

The transverse angle iron strut 24 shown in FIGS. 1, 2 and 4 extends the full width of the automobile with one end providing the mounting for wheel 20 and the other end the mounting for wheel 22. The outer end of strut 24 is reinforced against movement to the rear by the inclusion of the diagonal member 28. Thus, if, for example, bumper wheel 22 encounts an obstacle, the tire 46 will be compressed and the struts 24 and 28 will be sufficiently strong to absorb the collision load without damage to the frame or the body.

At the rear of the car, the bumper wheels 24 and 26 may be mounted on a generally similar structural arrangement comprised of struts 60 and 62 (see FIG. 2) which are bolted, welded or otherwise affixed to the related part of the car frame as at 64 and 65. Struts 60 and 62 are connected together at their outer ends to provide the foundation for a bumper wheel support like the axle 34 disclosed in FIG. 4. Likewise, a braking mechanism similar to that disclosed in FIG. 4 will be utilized with rear bumper wheels 24 and 26.

Figure 5:
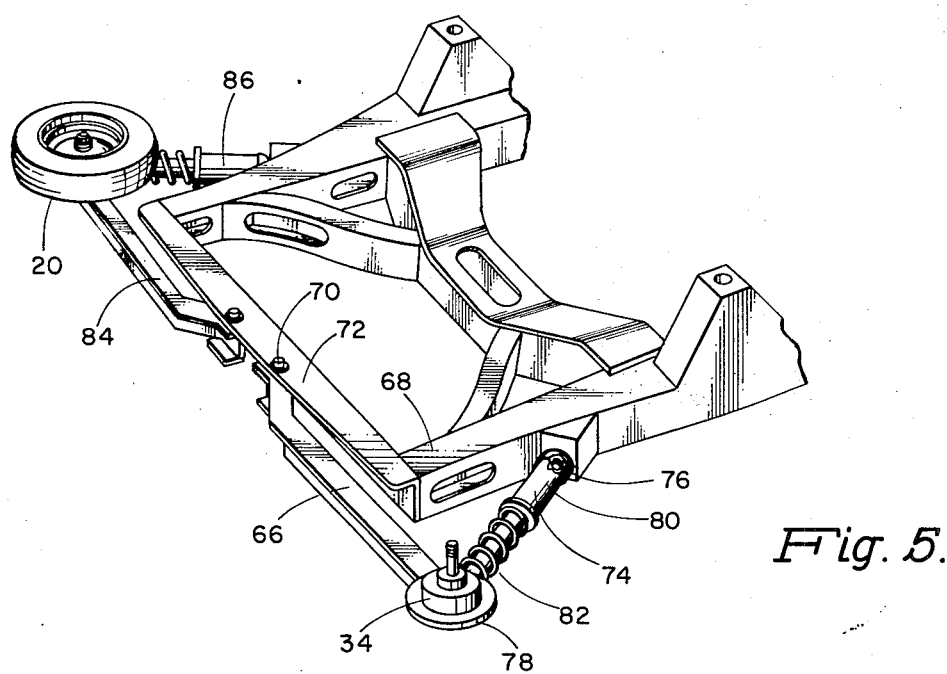
FIG. 5 is a perspective view of part of the vehicle frame showing a modification of the bumper wheel supporting means.

A modified means for mounting the bumper wheels is shown in FIG. 5. Here the strut 66 instead of being rigid with respect to frame 68, as is the case with strut 24 in relation to frame 26, is pivoted at 70 to the crossframe member 72. The other strut 74 is pivotally connected to frame 68 at 76 and also pivotally connected to strut 66 at 78. Strut 74 preferably includes a resilient force absorbing element 80 which in one form could be in the nature of a conventional shock absorber. A coil spring 82 is provided to restore the bumper wheel axle 34 and its associated bumper wheel 22 (not shown in FIG. 5) to its original position following a collision.

The struts 84 and 86 that carry bumper wheel 20 in FIG. 5 correspond to struts 66 and 74 and hence need not be described in detail.

Another alternative mounting means for the bumper wheels could be an integral extension of the front and rear parts of the vehicle frame to positions in alignment with the vehicle wheels. Thus, frame parts 26 and 64 could extend diagonally to replace struts 28 and 62.

It should also be noted that the vehicle frame 88 indicated in FIG. 2 is at a general height throughout its length that requires its positioning between the front and rear vehicle wheels. Thus, the struts 24 and 28 and 60 and 62 that carry the bumper wheels are extensions substantially in the same plane as the parts of frame 88 to which they are connected.

From the foregoing description of the invention, it will be recognized that an automobile utilizing bumper wheels arranged and supported in the manner disclosed will give exceptional protection against the majority of collisions which are so destructive of automobile fenders and adjacent body areas.

Modifications and further applications of the invention will now be apparent to those skilled in the art without departing from the spirit and scope of the invention.

I claim:

1. An automotive vehicle comprising front and rear wheels and a rigid frame on which are mounted a body and vehicle propulsion means, said frame having members that extend laterally to positions generally in longitudinal alignment with the wheels on each side of said vehicle, said body including fenders overlying said front and rear wheels, resilient impact absorbing units, each unit comprising a metal wheel and tire thereon and means for horizontally mounting said units on said frame members at the corners of said body in substantial alignment with said vehicle wheels, each said mounting means including a friction brake for controlling rotation of each said metal wheel, a first element of said brake comprising a fixed member having a circular area on which said wheel rests, means for rotatably locating said wheel on said circular area, a non-rotatable second element of said brake engaging the upper side of said metal wheel, and resilient means for applying downward pressure against said second element and said metal wheel whereby the frictional resistance to rotation of said metal wheel in either direction between said first and second elements may be controlled.

2. The construction set forth in claim 1, said locating means comprising an upwardly extending flange on said fixed member radially adjacent that part of said metal wheel that rests on said circular area.

3. The construction set forth in claim 1, said locating means comprising an upwardly extending circular portion on said fixed member adapted to cooperate with an interior circular peripheral part of said wheel.

4. The construction set forth in claim 1, the resilient means for applying downward pressure against said second element and against said metal wheel comprising a vertical shaft extending between said first and second elements and a compressible spring between the upper end of said shaft and said second element.

5. The construction set forth in claim 1, said second element being in the form of a downwardly turned dished plate whose rim engages said metal wheel above the said circular area on which said wheel rests.

6. The construction set forth in claim 1, said vehicle frame members comprising on each side of said vehicle a diagonal strut and a transverse strut, each said diagonal strut and transverse strut attached at one end to said frame and connected together near their other ends, each said resilient unit being mounted near the junction of said diagonal and transverse struts.

7. The construction as set forth in claim 6, one of said diagonal and transverse struts being pivotally mounted on said frame for limited movement about a vertical axis and the other of said struts including a resilient force absorbing element.

* * * * *